United States Patent [19]

Moores

[11] Patent Number: 4,620,796
[45] Date of Patent: Nov. 4, 1986

[54] ELECTRIC MIXER WITH BEATER EJECT MECHANISM

[75] Inventor: Gregory E. Moores, Reistertown, Md.

[73] Assignee: Black & Decker, Inc., Newark, Del.

[21] Appl. No.: 689,931

[22] Filed: Jan. 9, 1985

[51] Int. Cl.$^4$ ............................................. B01F 13/00
[52] U.S. Cl. ..................................... 366/344; 366/129
[58] Field of Search ................ 366/344, 129, 297, 300, 366/301, 279, 343, 601

[56] References Cited

U.S. PATENT DOCUMENTS

| | | |
|---|---|---|
| 2,515,755 | 7/1950 | Krause . |
| 2,552,023 | 5/1951 | Andresen ............................ 366/344 |
| 2,566,907 | 9/1951 | Robertson .......................... 366/344 |
| 2,680,637 | 6/1954 | Benoit ................................ 366/344 |
| 2,737,371 | 2/1956 | Gerry . |
| 2,812,166 | 11/1957 | DeAngelis et al. . |
| 3,271,013 | 9/1966 | Chambers et al. . |
| 3,341,181 | 9/1967 | Chambers et al. . |
| 3,356,344 | 8/1965 | Price . |
| 3,533,715 | 10/1970 | Gross . |
| 3,619,754 | 11/1971 | Fuchs . |
| 3,660,741 | 5/1972 | Walter . |
| 3,725,624 | 4/1973 | Emmons . |
| 4,071,789 | 1/1978 | Ernster et al. . |

Primary Examiner—Robert W. Jenkins
Attorney, Agent, or Firm—Finnegan, Henderson, Farabow, Garrett & Dunner

[57] ABSTRACT

An electric mixer for selectively rotating a pair of cooperating beaters, the mixer comprising a housing defining a cavity having an axis extending between first and second ends thereof, a motor disposed in the cavity generally coaxial with the cavity axis, the motor including an axial drive shaft and a drive gear fixed to the second end of the drive shaft, a gear case fixed to the second end of the motor, the gear case including a pair of integral, depending tubular shafts having rotation axes substantially parallel to each other and to the cavity axis, each tubular shaft having a bore open at the first and second ends thereof. The mixer further includes a drum coaxially disposed on each tubular shaft for rotation about the respective rotation axis, each drum including a driven gear integrally formed at the first end thereof and structure at the second end thereof for releasably engaging the shaft of one beater, the driven gears being in meshing engagement, and a reduction gear rotatably supported by the gear case, the reduction gear being driven by the drive gear and driving only one driven gear. The mixer further includes an ejector slidably disposed for axial movement in the cavity, the ejector having a first end projecting through an opening in the housing for manual actuation and a second end including a pair of depending rods, one rod being disposed in the bore of each tubular shaft through the open first end thereof for engaging the first end of the shaft of one beater.

10 Claims, 6 Drawing Figures

ELECTRIC MIXER WITH BEATER EJECT MECHANISM

BACKGROUND OF THE INVENTION

1. Field of the Invention

The invention relates to electric mixers and, in particular, electric mixers wherein the motor, gear set and beater eject mechanism are axially above the beater engaging devices.

2. Description of Related Art

A portable, hand-held electric mixer is a popular kitchen appliance present in virtually all households. Most such mixers incorporate an electric motor driving a worm gear arrangement for rotating the cooperating beaters. The worm gear arrangement is inefficient, requiring greater power than would be necessary to drive the beaters through a spur gear set. In order to incorporate a spur gear set into a hand held mixer, it is necessary to locate the gear set and motor axially above the rotating beaters. This presents a problem in incorporating a beater eject mechanism which has a convenient actuation button.

In known portable mixers using the worm gear arrangement, it is common practice to include a button located at the top of the mixer for conveniently ejecting the beaters from the mixer. Examples of such arrangements may be seen in U.S. Pat. Nos. 2,515,755, 2,737,371, 3,619,754 and 3,533,755.

Where a spur gear arrangement is desired, such as in a battery-powered portable mixer, alternative means for ejecting the beaters have been used. As an example see U.S. Pat. No. 3,33,825 to Wolter et al. which is directed to a battery powered mixer having a spur gear arrangement wherein a structural component of the housing is pivotally disposed for ejecting the beaters. The mixer of Wolter et al. has disadvantages presented by the lack of integrity of the housing and the relative inconvenience of the means of ejecting the beaters. The subject invention overcomes the disadvantages of the prior art devices by providing a portable electric mixer incorporating a spur gear drive mechanism and a beater eject mechanism wherein the actuation button is disposed on the top of the mixer at a convenient location.

Additional advantages of the invention are set forth in part in the description which follows, and in part will be obvious from the description, or may be learned from practice of the invention.

SUMMARY OF THE INVENTION

The objects and advantages of the invention may be realized and attained by means of the instrumentalities and combations as particularly pointed out in the appended claims.

An electric mixer for rotating a pair of cooperating beaters each having a shaft with a mixing structure at one end thereof comprising a housing, means in the housing for releasably engaging the other ends of the beater shafts in parallel relation, gear means in the housing for rotating the engaging means about parallel rotation axes, and motor means disposed in the housing in the plane of the rotation axes for driving the gear means. The invention further includes beater eject means straddling the motor means for manually pushing the beater shafts from the engaging means, the beater eject means having a first end disposed to engage the other ends of the beater shafts and to axially move in the plane of the rotation axes and a second end axially remote from the first end and projecting from the housing for manual contact.

Preferably, the beater eject means is an ejecter disposed in a cavity in the housing for slidable, axial movement between a first end and a second end of the cavity. The ejector has a first end projecting through an opening in the housing at the first end of the cavity for manual actuation and a second end including two spaced, parallel rods, each rod being coaxial with the rotation axis of a respective one of the beaters and being guidably received in an opening in a gear case means for axially engaging the end of the beater shaft.

In the preferred embodiment, the beater ejector comprises a U-shaped frame straddling the motor and defining a plane generally parallel to the plane of the rotation axes, the base of the frame traversing a first end of the motor and including an integrally formed button projecting through an opening in the housing. The legs of the frame depend from the base, axially extend adjacent the motor, and are slidably supported for axial movement by the wall of the housing. The ejector further includes a C-shaped member connecting the ends of the legs and circumferentially encircling a portion of the motor, and a strut axially depending from each end of the C-shaped member, the struts being in the plane of the rotation axes and the ends of the struts engaging the gear case means to limit axial movement of the ejector toward the second end. One end of each rod is secured to the end of the respective strut and defines a shoulder for engaging the second end of the motor to limit axial movement of the ejector toward the first end.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENT

Reference will now be made in detail to the present preferred embodiments of the invention, examples of which are illustrated in the accompanying drawings.

Figure 1:
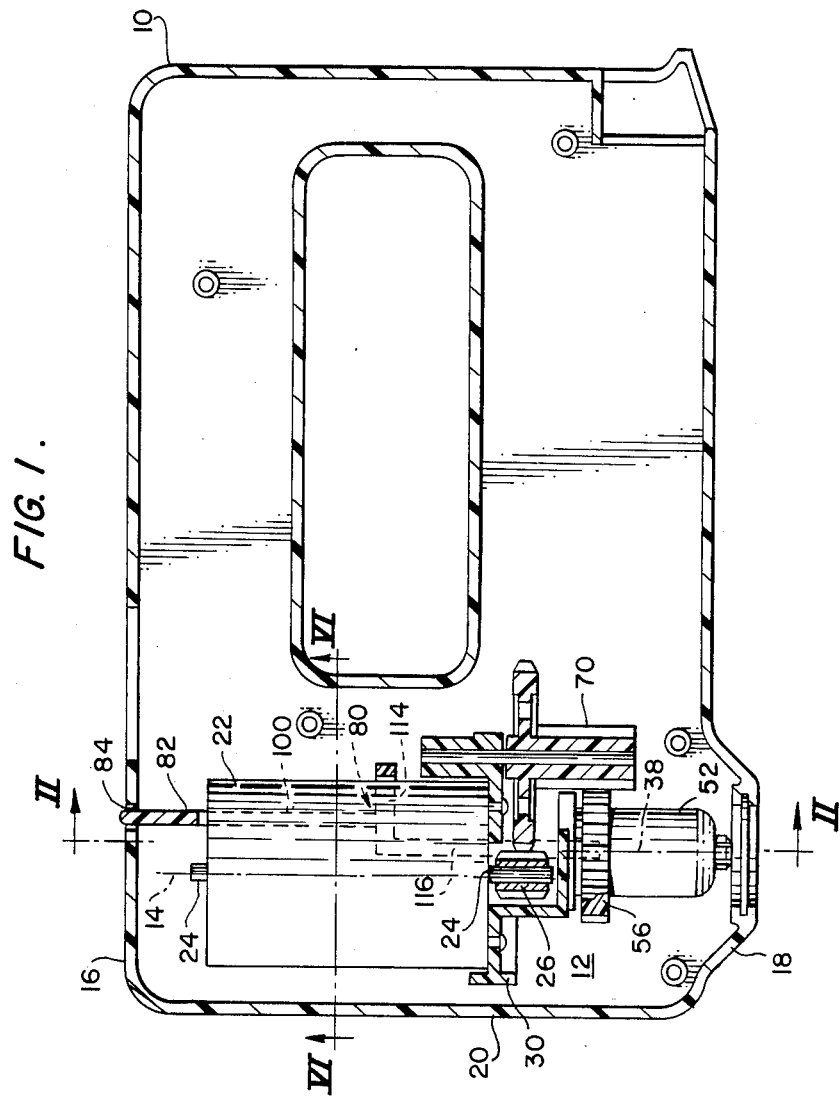
FIG. 1 is a cross sectional view of the mixer of the invention.

In accordance with the invention, an electric mixer for rotating a pair of cooperating beaters having shafts at one end thereof comprises a housing defining a cavity having an axis extending between first and second ends thereof. Preferably, as seen in FIG. 1, the housing 10 has a generally rectangular cross-section defining a cavity 12 having an axis 14 extending between first end 16 and second end 18 of cavity 12. Preferably, cavity 12 is located proximate one side 20 of housing 10 and cavity axis 14 is substantially parallel to one side 20.

In a preferred embodiment, the housing comprises two clamshell halves each having structural components molded on the interior thereof for cooperating to support the internal components of the mixer.

In accordance with the invention, the mixer includes gear means disposed in the cavity proximate the second end thereof for releasably engaging the ends of the beater shafts and for rotating the beaters about rotation axes parallel to each other and to the cavity axis, motor means coaxially disposed in the cavity proximate the first end thereof for driving the gear means, and gear case means secured to the motor means for rotatably supporting the gear means.

Figure 2:
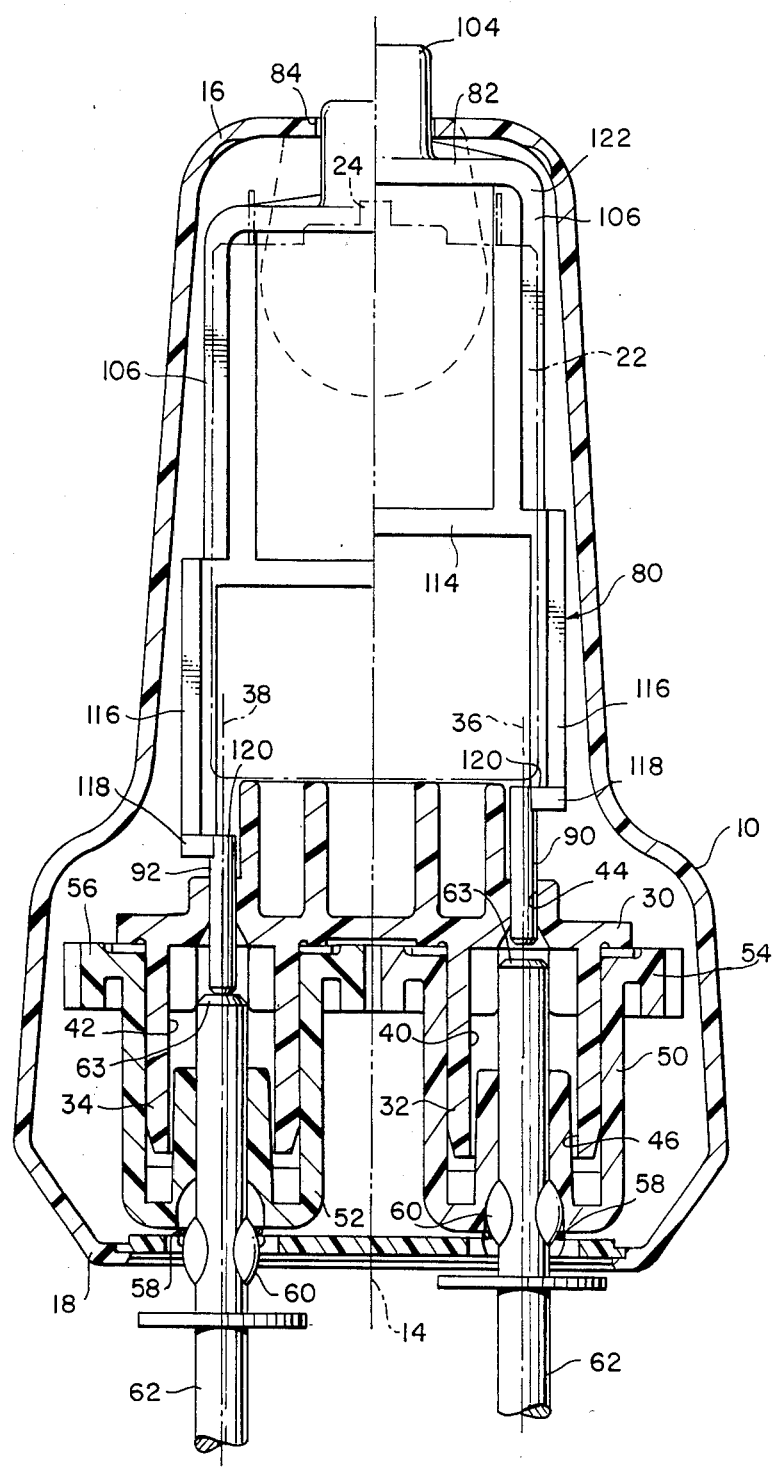
FIG. 2 is a cross sectional view of the mixer taken along line II—II of FIG. 1.

As embodied herein and depicted in FIGS. 1 and 2, the motor means comprises a generally cylindrical motor 22 disposed in cavity 12 and supported by the internal structure of housing 10. Motor 22 is disposed generally coaxial with cavity axis 14 and includes an axial drive shaft 24 and a drive gear 26 fixed to the second end of drive shaft 24.

The gear case means comprises a gear case 30 fixed to the second end of motor 22. Preferably gear case 30 includes a pair of integral, depending, tubular shafts 32, 34. Tubular shafts 32, 34 have rotation axes 36, 38 substantially parallel to each other and parallel to cavity axis 14. Each tubular shaft 32, 34 has an axial bore 40, 42 open at each end. As may be seen in FIG. 2, tubular shaft 32, for example, has bore 40 open at the first end through opening 44 and at the second end through opening 46. Tubular shaft 34 has similar openings.

In the preferred embodiment, the gear means comprises a drum 50, 52 coaxially, rotatably disposed on each tubular shaft 32, 34 for rotation about the respective rotation axes 36, 38. Each drum 50, 52 includes a driven gear 54, 56 coaxially, integrally formed at the first end of the drum. The drums 50, 52 further include means at the second ends thereof for releasably engaging the shaft end of respective beaters. As seen in FIG. 2, drums 50, 52 include spring detents 58 for releasably engaging protrusions 60 on beater shafts 62. Preferably driven gears 54, 56 are in meshing engagement.

The gear means of the mixer further comprises a reduction gear 70 (FIG. 1) rotatably supported by gear case 30. Reduction gear 70 is in driving engagement with drive gear 26 fixed to drive shaft 24 of motor 22. Reduction gear 70 is also in driving engagement with only one driven gear 54 or 56 such that rotation of reduction gear 70 rotates both driven gears and the integrally formed drums 50, 52. This spur gear arrangement rotates beater shafts 62 releasably engaged in drums 50, 52 about their respective rotation axes.

As may be seen in FIGS. 1 and 2, the entire drive mechanism incorporating motor 22, gear case 30, reduction gear 70, driven gears 54, 56, and drums 50, 52 is axially disposed in cavity 12.

In accordance with the invention, the mixer comprises a beater ejector disposed in the cavity for slidable, axial movement, the ejector having a first end projecting through an opening in the housing at the first end of the cavity for manual actuation and a second end including two spaced, parallel rods, each rod being coaxial with the rotation axis of the respective one of the beaters and being guidably received in an opening in the gear case means for axially engaging the shaft end of the respective beater releasably engaged in the gear means.

As may be seen in FIG. 1 and 2, beater ejector 80 is disposed in cavity 12 for slidable axial movement. The ejector has a first end 82 projecting through opening 84 in housing 10 at first end 16 of cavity 12 for manual actuation. The beater ejector 80 has a second end including two spaced parallel rods 90, 92. Each rod 90, 92 is coaxial with a respective rotation axis 36, 38 of a respective one of the beaters 62 and is guidably received through the opening in gear case 30 at the first end of respective bore 40, 42 for axially engaging the shaft end 63 of beater shaft 62. In operation, insertion of beater shafts 62 into drums 50, 52 forces ejector 80 upward as seen on the right side of FIG. 2. This causes upper end 82 to project from opening 84 at the top of housing 10. To eject beaters 62 the operator manually depresses first end 82 of ejector 80 causing axial movement of rods 90, 92 downwardly as seen on the left side of FIG. 2 engaging the upper ends 63 of beater shafts 62 thereby forcing them free of spring mechanism 58 releasably holding the beater shafts in place.

Figure 3:
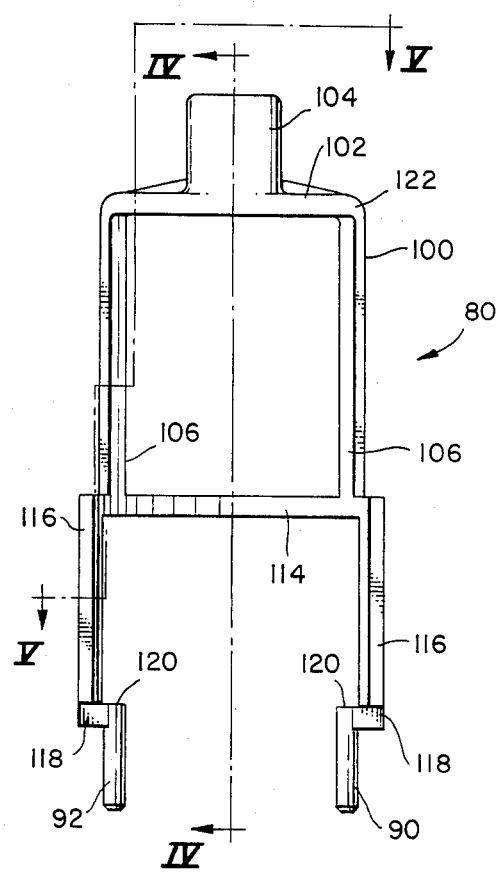
FIG. 3 is a plan view of the ejector mechanism of the invention.
Figure 4:
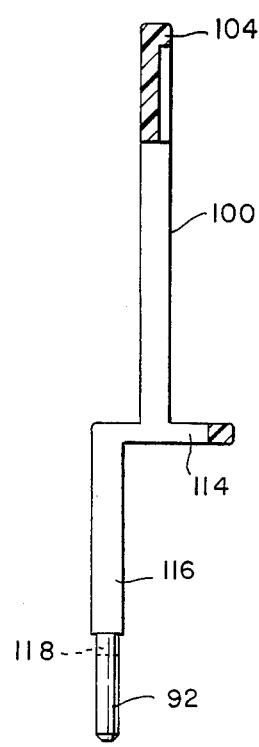
FIG. 4 is a cross sectional view of the ejector of FIG. 3 taken along lines IV—IV.
Figure 5:
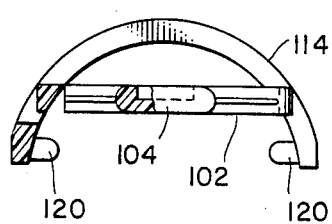
FIG. 5 is a cross-sectional view of the ejector of FIG. 3 taken along lines V—V.
Figure 6:
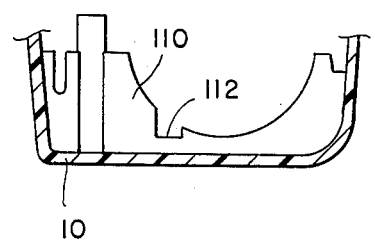
FIG. 6 is a cross-sectional view of part of the housing taken along lines VI—VI in FIG. 1.

In the preferred embodiment, beater ejector 80, as seen in FIGS. 3, 4, and 5, comprises a U-shaped frame 100 stradling motor 22 and defining a plane generally parallel to the plane of rotation axes 36, 38 (see FIG. 1). Base 102 of frame 100 traverses the first end of motor 22 (see FIG. 2) and includes an integrally formed button 104 projecting through opening 84 in housing 10. Legs 106 of frame 100 depend from base 102, axially extend adjacent motor 22 and are slidably supported for axial movement by the wall of housing 10. As seen in FIG. 6, internal supporting structure 110 of housing 10 includes notches 112 for slidably supporting legs 106 during axial movement within cavity 12.

Ejector 80 further includes C-shaped member 114 connecting the ends of legs 106 and circumferentially encircling a portion of motor 22. A strut 116 axially depends from each end of C-shaped member 114. As seen in FIG. 1, struts 116 are in the plane of rotation axes 36, 38 and, as seen in FIG. 2, the ends 118 of struts 116 engage gear case 30 to limit axial movement of ejector 80 toward second end 18 of cavity 12. One rod 90, 92 is secured to the end 118 of each strut 116 and defines a shoulder 120 for engaging the second end of motor 22 to limit axial movement of ejector 80 toward first end 16 of cavity 12. Axial movement of ejector 80 toward first end 16 of cavity 12 is also limited by contact between shoulder 122 formed by the intersection of base 102 and legs 106 of frame 100 with the inside wall of housing 10 as seen in FIG. 2.

The combination of the invention provides a compact portable electric mixer incorporating an efficient spur gear arrangement and a beater ejector mechanism having the actuation button conveniently located on the top of the mixer for manual actuation.

It will be apparent to those skilled in the art that various modifications and variations could be made to the mixer of the invention without departing from the scope or spirit of the invention.

What is claimed is:

1. An electric mixer for rotating a pair of cooperating beaters having shafts at one end thereof, the mixer comprising:

(a) a housing defining a cavity having an axis extending between first and second ends thereof;
   (b) gear means disposed in said cavity proximate the second end thereof for releasably engaging the ends of the beater shafts and for rotating said beaters about rotation axes parallel to each other and to said cavity axis;

(c) motor means coaxially disposed in said cavity proximate the first end thereof for driving said gear means;

(d) gear case means secured to said motor means for rotatably supporting said gear means; and (e) a beater ejector disposed in said cavity for slidable, axial movement, said ejector having a first end projecting through an opening in said housing at the first end of said cavity for manual actuation and a second end including two spaced, parallel rods, each said rod being coaxial with the rotation axis of a respective one of said beaters and being guidably received in an opening in said gear case means for axially engaging the shaft end of said respective beater releasably engaged in said gear means.

2. The mixer of claim 1 wherein said housing has a generally rectangular cross-section, said cavity is located proximate one side thereof, and said cavity axis is generally parallel to said one side of said housing.

3. The mixer of claim 2 wherein said motor means is generally cylindrical motor having an axial drive shaft extending from said motor toward the second end of said cavity.

4. The mixer of claim 3 wherein said gear case means includes a pair of integral, depending tubular shafts respectively coaxial with said rotation axes, each said tubular shaft having an axial bore opened at each end thereof for guidably receiving a respective one of said rods.

5. The mixer of claim 4 wherein said gear means comprises a drum coaxially, rotatably disposed on each said tubular shaft, each drum including a driven gear coaxially, integrally formed at the first end thereof and means at the second end thereof for releasably engaging the shaft end of a respective beater, the driven gears on said drums being in meshing engagement.

6. The mixer of claim 5, wherein said gear means further comprises a spur drive gear fixed to the end of said motor drive shaft and a reduction gear supported for rotation by said gear case means, said reduction gear being driven by said drive gear and driving at least one said driven gears at reduced speed.

7. An electric mixer for selectively rotating a pair of cooperating beaters, said mixer comprising:

(a) a housing defining a cavity having an axis extending between first and second ends thereof;

(b) a motor disposed in said cavity generally coaxial with said cavity axis, said motor including an axial drive shaft extending from said motor toward the second end of said cavity and a drive gear fixed to the end of said drive shaft;

(c) a gear case fixed to the lower end of said motor, said gear case including a pair of integral, depending tubular shafts, said tubular shafts having rotation axes substantially parallel to each other and to said cavity axis, each said shaft having a bore open at the first and second ends thereof;

(d) a drum coaxially disposed on each said tubular shaft for rotation about the respective rotation axis, each drum including a driven gear integrally formed at the first end thereof and means at the second end thereof for releasably engaging a shaft of one said beater, said driven gears being in meshing engagement;

(e) a reduction gear rotatably supported by said gear case, said reduction gear being driven by said drive gear and driving at least one said driven gear; and (f) an ejector slidably disposed for axial movement in said cavity, said ejector having a first end projecting through an opening in said housing for manual actuation and a second end including a pair of depending rods, one said rod being disposed in the bore of each said tubular shaft through the open first end thereof for engaging the first end of the shaft of one of said beaters.

8. The mixer of claim 3 or 7 wherein said beater ejector comprises:

(a) a U-shaped frame defining a plane generally parallel to the plane of said rotation axes, the base of said frame traversing the first end of said motor and including an integrally formed button projecting through said opening in the housing, the legs of said frame depending from said base, axially extending adjacent said motor, and being slidably supported for axial movement by the wall of said housing;

(b) a C-shaped member connecting the ends of said legs and circumferentially encircling a portion of said motor; and (c) a strut axially depending from each end of said C-shaped member, said struts being in th plane of said rotation axes and the ends of said struts engaging said gear case means to limit axial movement of said ejector toward said second end, one of said rods being secured to the end of each strut and defining a shoulder for engaging the second end of said motor to limit axial movement of said ejector towards said first end.

9. An electric mixer for rotating a pair of cooperating beaters each having a shaft with a mixing structure at one end thereof, said mixer comprising:

(a) a housing;

(b) means in said housing for releasably engaging the other ends of said beater shafts in parallel relation;

(c) gear means in said housing for rotating said engaging means about parallel rotation axes;

(d) motor means disposed in said housing in the plane of said rotation axes for driving said gear means; and (e) beater eject means straddling said motor means for manually pushing said beater shafts from said engaging means, said beater eject means having a first end projecting from said housing for manual contact and a second end axially spaced from said first end disposed to engage the other ends of said beater shafts and to axially move in the plane of said rotation axes.

10. In an electric mixer for rotating a pair of cooperating beaters about parallel rotation axes including a housing and a cylindrical motor disposed in said housing, each said rotation axis being parallel to and equally radially spaced from the axis of said motor, said radial spacing being less than the radius of said motor, the improvement comprising:

(a) a one-piece beater ejector disposed in said housing for axial movement and having axially spaced first and second ends, said first end straddling said motor and including a button projecting through said housing for axial movement on a button axis parallel to said motor axis, said button axis being radially spaced from said motor axis less than the radius of said motor, and said second end being axially movable in the plane of said rotation axes and including two rods, each said rod being coaxial with a respective one of said rotation axes and being disposed to axially contact a respective one of said beaters.

* * * * *